United States Patent
Meitl et al.

(10) Patent No.: US 11,430,375 B1
(45) Date of Patent: Aug. 30, 2022

(54) PULSE-DENSITY-MODULATION PIXEL CONTROL CIRCUITS AND DEVICES INCLUDING THEM

(71) Applicant: X Display Company Technology Limited, Dublin (IE)

(72) Inventors: Matthew Alexander Meitl, Durham, NC (US); Christopher Andrew Bower, Raleigh, NC (US); Ronald S. Cok, Rochester, NY (US); Robert R. Rotzoll, Colorado Springs, CO (US); Lee B. Baker, Raleigh, NC (US)

(73) Assignee: X Display Company Technology Limited, Dublin (IE)

( * ) Notice: Subject to any disclaimer, the term of this patent is extended or adjusted under 35 U.S.C. 154(b) by 0 days.

(21) Appl. No.: 17/207,300

(22) Filed: Mar. 19, 2021

(51) Int. Cl.
| | |
|---|---|
| *G09G 3/32* | (2016.01) |
| *H04N 7/52* | (2011.01) |
| *H04N 5/926* | (2006.01) |
| *G09G 3/20* | (2006.01) |

(52) U.S. Cl.
CPC ............. *G09G 3/32* (2013.01); *G09G 3/204* (2013.01); *H04N 5/926* (2013.01); *H04N 7/52* (2013.01); *G09G 2320/0646* (2013.01)

(58) Field of Classification Search
CPC ....................................................... G09G 3/32
USPC .......................................................... 348/471
See application file for complete search history.

(56) References Cited

U.S. PATENT DOCUMENTS

| | | |
|---|---|---|
| 5,550,066 A | 8/1996 | Tang et al. |
| 7,622,367 B1 | 11/2009 | Nuzzo et al. |
| 7,880,184 B2 | 2/2011 | Iwafuchi et al. |
| 8,506,867 B2 | 8/2013 | Menard |
| 8,722,458 B2 | 5/2014 | Rogers et al. |
| 8,889,485 B2 | 11/2014 | Bower |
| 9,177,510 B2 | 11/2015 | Miyake |
| 9,520,537 B2 | 12/2016 | Bower et al. |
| 9,930,277 B2 | 3/2018 | Cok |
| 9,991,163 B2 | 6/2018 | Bower et al. |
| 10,360,846 B2 | 7/2019 | Cok et al. |

(Continued)

OTHER PUBLICATIONS

Cok, R. S. et al., Inorganic light-emitting diode displays using micro-transfer printing, Journal of the SID, 25(10):589-609, (2017).

*Primary Examiner* — Long D Pham
(74) *Attorney, Agent, or Firm* — Choate, Hall & Stewart LLP; Michael D. Schmitt (57) ABSTRACT

A pulse-density-modulation display and image capture system comprises a display comprising a plurality of pixels. Each pixel comprises a light emitter that controllably emits light at a constant current for a variable amount of time and a control circuit connected to the light emitter to control the light emitter to emit light in response to an input signal specifying the desired luminance of the light emitter. The control circuit converts the input signal to a non-contiguous pulse-density-modulation signal and controls the light emitter to emit light in response to the non-contiguous pulse-density-modulation signal with a temporally variable constant-current control signal. Each pixel emits light responsive to a display timing signal. The pulse-density-modulation display and image capture system also comprises a sampling camera that records the pixels and is responsive to a camera timing signal different from the display timing signal.

23 Claims, 8 Drawing Sheets

(56) References Cited

U.S. PATENT DOCUMENTS

| | | |
|---|---|---|
| 2009/0167674 A1* | 7/2009 | Katsu .................. G09G 3/3426 |
| | | 345/102 |
| 2009/0295697 A1 | 12/2009 | Su |
| 2009/0309869 A1* | 12/2009 | Umeda ................ G09G 3/3648 |
| | | 345/214 |
| 2010/0253668 A1 | 10/2010 | Sugihara et al. |
| 2010/0309179 A1 | 12/2010 | Missbach |
| 2011/0057861 A1 | 3/2011 | Cok et al. |
| 2011/0234579 A1* | 9/2011 | Kuo ...................... G09G 3/342 |
| | | 345/214 |
| 2015/0372053 A1 | 12/2015 | Bower et al. |
| 2016/0064363 A1 | 3/2016 | Bower et al. |
| 2016/0093600 A1 | 3/2016 | Bower et al. |
| 2016/0163253 A1 | 6/2016 | Chaji et al. |
| 2016/0276326 A1* | 9/2016 | Natarajan ............... H01L 31/18 |
| 2017/0025593 A1 | 1/2017 | Bower et al. |
| 2017/0048393 A1 | 2/2017 | Bostick et al. |
| 2017/0061867 A1 | 3/2017 | Cok et al. |
| 2017/0083468 A1 | 3/2017 | Sengoku |
| 2017/0186356 A1 | 6/2017 | Cok |
| 2017/0187976 A1 | 6/2017 | Cok |
| 2017/0330509 A1 | 11/2017 | Cok et al. |
| 2018/0019747 A1 | 1/2018 | Ikegawa et al. |
| 2018/0033853 A1 | 2/2018 | Bower et al. |
| 2018/0182286 A1* | 6/2018 | Ahmed ................ G09G 3/3283 |
| 2018/0191978 A1 | 7/2018 | Cok et al. |
| 2018/0197471 A1 | 7/2018 | Rotzoll et al. |
| 2018/0323180 A1 | 11/2018 | Cok |
| 2019/0180675 A1 | 6/2019 | Jang et al. |
| 2019/0347980 A1* | 11/2019 | Kuo ........................ G09G 3/32 |
| 2022/0122519 A1 | 4/2022 | Bower et al. |
| 2022/0122520 A1 | 4/2022 | Cok et al. |

* cited by examiner

PULSE-DENSITY-MODULATION PIXEL CONTROL CIRCUITS AND DEVICES INCLUDING THEM

TECHNICAL FIELD

The present disclosure relates to pixel control circuits for light-emitting displays that use temporal constant-current control.

BACKGROUND

Large-format inorganic light-emitting diode (iLED) displays are used in outdoor and stadium displays and are increasingly used in public indoor areas for information presentation to large groups. Such displays are also often found in television broadcast studios that incorporate video cameras. Today, many members of the public as well as media company employees carry video recording devices (video cameras) and use them in locations including displays, for example in smartphones. However, video recordings of electronic displays can suffer from a very perceptible flicker.

Displays are typically refreshed with new images at a frame rate using a progressive scan from the top of a display to the bottom or with an interlaced scan alternating lines written to the display. Video recordings also employ an acquisition frame rate. When the display and acquisition frame rates are different frame rates or are out of phase, the resulting captured image can have a perceptible flicker, for example seen as bars scrolling from top to bottom of the screen, or can have one of every several frames being noticeably and inappropriately brighter or dimmer than the other frames.

There is a need, therefore, for pixel control circuits in displays that reduce perceptible flicker in video records of an electronic display.

SUMMARY

According to some embodiments of the present disclosure, among other embodiments, a pulse-density-modulation display and image capture system comprises a display comprising a plurality of pixels. Each pixel comprises one or more light emitters that controllably emits light at a constant current for a variable amount of time and a control circuit connected to the light emitter to control the light emitter to emit light. The control circuit is responsive to a display input signal specifying the desired luminance of the light emitter(s). The control circuit converts the input signal to a non-contiguous pulse-density-modulation signal and controls the light emitter to emit light in response to the non-contiguous pulse-density-modulation signal with a temporally variable constant-current control signal. In some embodiments, each pixel receives a non-contiguous pulse-density-modulation signal. Each pixel emits light responsive to a display timing signal. A sampling camera records pixels responsive to a camera timing signal different from the display timing signal.

The light emitters can be inorganic light emitters, for example inorganic light-emitting diodes, the input signal can be an analog signal, or the input signal can be a digital signal, or any combination of these.

According to some embodiments of the present disclosure, the non-contiguous pulse-density-modulation (PDM) signal comprises a number of PDM pulses that (i) is greater than a number of pulse-width-modulation (PWM) pulses for an equivalent signal, (ii) is different from the number of bits in the input signal (e.g., is greater than the number of bits in the input signal, is greater than one half of the number of bits in the input signal, or is greater than one quarter of the number of bits in the input signal), (iii) the maximum period of any of the PDM pulses is less than a maximum period of any of the PWM pulses for an equivalent signal, (iv) the maximum period of any PDM pulse is one half or less of the maximum period of any PWM pulse, (v) the maximum period of any PDM pulse is no more than twice the shortest period of any PWM pulse, or (vi) any one or combination of (i), (ii), (iii), (iv) and (v).

According to some embodiments, the non-contiguous pulse-density-modulation signal comprises pulses and the pulses are separated in time, for example evenly distributed in time, the pulses have a common period, or both. In some embodiments, the pulses have a period that varies by no more than a factor of two. The non-contiguous pulse-density-modulation signal can comprise pulses that correspond to single-bit pulses, two-bit pulses, or half-bit pulses.

According to some embodiments, the display timing signal has a different period and frequency from the camera timing signal, the display timing signal is out of phase with the camera timing signal, or both. The non-contiguous pulse-density-modulation signal can be a delta sigma signal.

According to some embodiments of the present disclosure, a pulse-density-modulation control integrated circuit comprises a control circuit responsive to a display input signal specifying the desired luminance of a light emitter. The control circuit is operable to convert the display input signal to a non-contiguous pulse-density-modulation signal, e.g., with a conversion circuit. A drive circuit responsive to the pulse-density-modulation signal can produce a temporally variable constant-current control signal.

According to some embodiments of the present disclosure, a pulse-density-modulation pixel control circuit comprises a light emitter that controllably emits light at a constant current for a variable amount of time, an input circuit responsive to a display input signal specifying the desired luminance of the light emitter, and a control circuit connected to the light emitter to control the light emitter to emit light. The control circuit is responsive to the display input signal, converts the display input signal to a non-contiguous pulse-density-modulation signal, and controls the light emitter to emit light in response to the non-contiguous pulse-density-modulation signal with a temporally variable constant-current control signal. In some embodiments, the display input signal is a first input signal, the light emitter is a first light emitter, and the pulse-density-modulation pixel control circuit comprises a second light emitter that controllably emits light at a constant current for a variable amount of time and an input circuit responsive to a second input signal specifying the desired luminance of the second light emitter. The control circuit can be responsive to the second input signal and connected to the second light emitter to control the second light emitter to emit light, the control circuit. The control circuit converts the second input signal to a second non-contiguous pulse-density-modulation signal and controls the second light emitter to emit light in response to the second non-contiguous pulse-density-modulation signal with a temporally variable constant-current control signal.

According to some embodiments, the non-contiguous pulse-density-modulation signal comprises a number of pulse-density-modulation (PDM) pulses and the number of PDM pulses emitted by the display is greater than the number of PDM pulses recorded by the sampling camera.

According to some embodiments, the camera timing signal specifies a camera frame period, the display timing signal specifies a display frame period, and the camera frame period is shorter than the display frame period. The control circuit can control the light emitter to not emit light during an interframe period when the camera is not recording. According to some embodiments, the camera timing signal specifies a camera frame period, the display timing signal specifies a display frame period, and the camera frame period is longer than the display frame period.

According to some embodiments of the present disclosure, a pulse-density-modulation display comprises a plurality of pixels. Each pixel can comprise a light emitter that controllably emits light at a constant current for a variable amount of time and a control circuit connected to the light emitter to control the light emitter to emit light. The control circuit can be responsive to an input signal specifying the desired luminance of the light emitter, converts the input signal to a non-contiguous pulse-density-modulation signal, and controls the light emitter to emit light in response to the non-contiguous pulse-density-modulation signal with a temporally variable constant-current control signal. The control circuit can control the pixel with a frame rate that is less than 24 frames per second or no greater than 10 frames per second.

According to some embodiments of the present disclosure, a pulse-density-modulation display comprises a plurality of pixels. Each pixel comprises a light emitter that controllably emits light at a constant current for a variable amount of time and a control circuit connected to the light emitter to control the light emitter to emit light. The control circuit is responsive to a display input signal specifying the desired luminance of the light emitter. The display input signal is a non-contiguous pulse-density-modulation signal and controls the light emitter to emit light in response to the non-contiguous pulse-density-modulation signal with a temporally variable constant-current control signal. According to some embodiments, the display input signal specifies a display frame rate, and the control circuit specifies a display output rate less than the display frame rate, the display output rate limiting the rate at which the light emitter can emit light in response to the non-contiguous pulse-density-modulation signal.

The pulse-density-modulation display can comprise a display substrate and the plurality of pixels can be disposed in an array on the display substrate. The light emitter or the control circuit, or both the light emitter and the control circuit can be disposed directly on the display substrate. According to some embodiments, the light emitter comprises a light-emitter substrate separate and independent from the display substrate and a fractured or separated tether attached to or part of the light-emitter substrate. Each pixel of the plurality of pixels can comprise a pixel substrate separate and independent from the display substrate and the light emitter or the control circuit, or both the light emitter and the control circuit, can be disposed directly on the pixel substrate. The pixel substrate can be disposed directly on the display substrate. The pixel module can comprise a fractured or separated tether.

Certain embodiments of the present disclosure provide a control circuit for a display that exhibits less flicker when recorded by an unsynchronized video camera. Control circuits disclosed herein are suitable for inorganic micro-light-emitting diodes and can be applied in an array of pixels in a display.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

DETAILED DESCRIPTION OF CERTAIN EMBODIMENTS

Certain embodiments of the present disclosure provide a control circuit for an image display that is less sensitive to flicker when recorded by a video camera (video recorder). The control circuit uses a pulse density modulation (PDM) signal to distribute a digital control signal more evenly in time, thereby reducing flicker for observers of the display and in video recordings of the functioning display. In general, video cameras sample images over time and where the sampling frequency or phase of the video camera is different from the frame rate or phase of the display (which is often the case), the recorded images (video image sequence or video) can exhibit flicker.

Figure 1A:
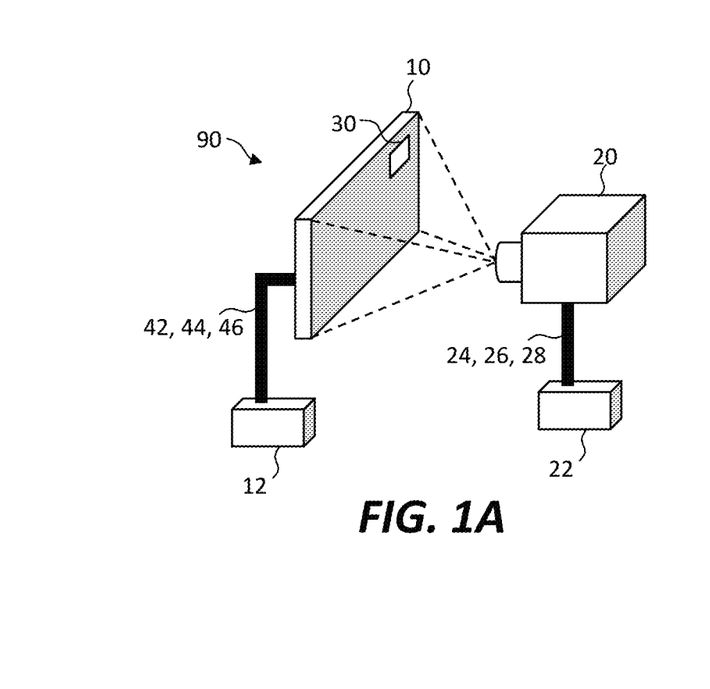
FIG. 1A is a perspective of a display and image capture system and FIG. 1B is a schematic diagram of a pixel in the display according to illustrative embodiments of the present disclosure.
Figure 1B:
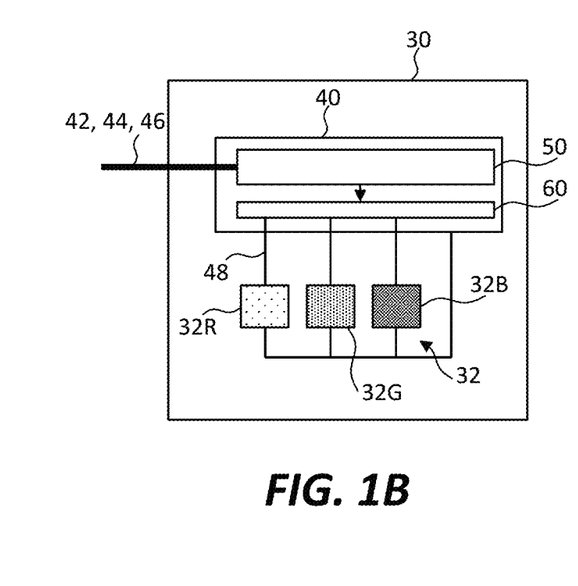

According to some embodiments of the present disclosure and as illustrated in FIGS. 1A and 1B, a pulse-density-modulation display and image capture system 90 comprises a display 10 and a temporally sampling camera 20 (camera 20). Display 10 comprises a plurality of pixels 30, for example arranged in an array on a display substrate. Each pixel 30 comprises a light emitter 32 and a control circuit 40. Light emitter 32 controllably emits light at a constant current for a variable amount of time.

Control circuit 40 can comprise a conversion circuit 50 connected to a drive circuit 60. Drive circuit 60 of control circuit 40 is connected to light emitter(s) 32 to control light emitter(s) 32 to emit light. Control circuit 40 is responsive to a display input signal 42 specifying the desired luminance of light emitter(s) 32. Conversion circuit 50 of control circuit 40 converts display input signal 42 to a non-contiguous pulse-density-modulation signal 48 and drive circuit 60 drives light emitter 32 to emit light in response to non-contiguous pulse-density-modulation signal 48 with a temporally variable constant-current control signal.

Pixels 30 can each comprise multiple light emitters 32, for example red-light emitter 32R that emits red light, green-light emitter 32G that emits green light, and blue-light emitter 32B that emits blue light, collectively light emitters 32 that each emit light at a constant current for a variable amount of time and, optionally, at a constant voltage. Each pixel 30 emits light responsive to a display timing signal 46, for example communicated through a display control bus 44 (e.g., a collection of wires for transmitting electronic signals).

Camera 20 can be responsive to a camera timing signal 26 different from display timing signal 46 to record pixels 30 of display 10. For example, camera timing signal 26 and display timing signal 46 can have different periods (frequencies) or different phases, for example commencing at different times and displaying or recording images at different image frame rates. Display and camera timing signals 26, 46, can specify the start and period of image frame display or image frame capture, respectively.

According to embodiments of the present disclosure, display 10 displays information (e.g., display input signal 42 transmitted on display control bus 44) with pixels 30 comprising control circuits 40. Display 10 is controlled to display an image for a frame period (e.g., 1/60 second at a frame rate of 60 frames per second). A video image comprises a sequence of images consecutively displayed by display 10 for each frame period. If the frame period is short enough, the human visual system visually averages the sequence of images to perceive a continuous, moving or changing image over time.

Display input signal 42 can be a binary digital signal, an encoded digital signal, or an analog signal (e.g., corresponding to a charge, for example stored on a capacitor) that is converted into a digital binary signal, such as PDM signal 48.

Light emitters 32 can be light-emitting diodes (e.g., inorganic light emitting diodes or organic light-emitting diodes) that can switch very rapidly between an on-state and an off-state (e.g., within a few micro-seconds, one micro-second, or less than a micro-second) in response to a digital control signal (e.g., either on at a fixed voltage and emitting light or off and not emitting light at, for example, zero volts). The digital control signal can be a non-contiguous pulse-density-modulation signal (PDM signal) 48 that comprises a series of on signals (also called pulses herein) during which light emitters 32 emit light interspersed with off signals during which light emitters 32 do not emit light within each display frame displaying a single image. Hence, PDM signal 48 is non-contiguous, since it does not constantly emit light during the display frame. The apparent brightness of a pixel 30 varies by varying the amount of time pulses are active at a constant brightness (e.g., responsive to a constant current and a constant voltage) within a display frame. The human visual system averages the light emitted during the pulses in each display frame to perceive an average brightness during the display frame, if the pulses are sufficiently fast and short. In contrast, light emitters in displays driven by a variable voltage or variable current displays are on for the entire display frame but at a brightness dependent on the voltage or current supplied to the light emitters. Light-emitting diodes can have variable efficiency depending on the voltage or current supplied; thus light-emitting diodes driven at a constant current and voltage for variable amounts of time, and according to embodiments of the present disclosure, can be more power efficient by operating at or near peak efficiency during the pulses and otherwise being off.

Display 10 can be a flat-panel display 10 controlled by display controller 12 through a display control bus 44 that transmits display input signal 42 and display timing signal 46. Display input signal 42 specifies the desired brightness of each light emitter 32 in pixel 30 for each pixel 30 in display 10. Display input signal 42 can be a digital signal or an analog signal. Display timing signal 46 specifies the period and phase of display frames for display 10. Display input signal 42 and display timing signal 46 can be temporally combined on a common display control bus 44 or a common wire (e.g., multiplexed).

Camera 20 can be an electronic camera (e.g., a digital camera with video recording capability) controlled by camera controller 22 through a camera control bus 24 that carries camera output signal 28 and camera timing signal 26. Camera output signal 28 specifies the recorded brightness of each light emitter 32 in pixel 30 for each pixel 30 in display 10. Camera timing signal 26 specifies the period and phase of camera frames for camera 20. According to embodiments of the present disclosure, display timing signal 46 and camera timing signal 26 are different, for example having different frequencies, can be out of phase, and can be completely and entirely independent signals.

According to embodiments of the present disclosure, both a pulse width modulation signal and a pulse density modulation signal 48 is a binary digital signal that turns on a light emitter for variable amounts of time at a constant brightness. In a pulse width modulation signal (PWM), the total amount of time in a frame is divided into pulses each of whose temporal length corresponds to a single bit of the binary digital signal. Thus, in a three-bit PWM signal, a first bit corresponds to first bit period (a first length of time), a second bit corresponds to a second bit period (a second length of time) that is twice as long as the first length of time, and a third bit corresponds to a third bit period (a third length of time) that is twice as long as the second length of time and four times as long as the first length of time. Each light emitter is then turned on (or off) for the length of time corresponding to the three-bit PWM signal. Thus, a PWM signal has a number of pulses equal to the number of bits in the source signal and the relative periods of the pulses correspond to powers of two. The pulses in a PWM signal can be temporally contiguous, or not. If the bits in the PWM signal are all on or all off, the corresponding pulses must be contiguous in the frame period.

In contrast to a pulse width modulation signal, a non-contiguous pulse density modulation (PDM) signal 48 comprises pulses having periods that do not necessarily correspond to a bit value (e.g., factors of 1, 2, 4 in a three-bit digital signal). Instead, in some embodiments, a non-contiguous PDM signal 48 comprises a series of pulses distributed relatively evenly throughout a frame period. The PDM pulses can be the same length (unlike a PWM signal). The sum of the periods that the PWM and PDM pulses are on is the same for an equivalent signal, but the distribution of pulses in time through the frame period is different. A non-contiguous pulse density modulation signal 48 can be a delta sigma signal. For example, PDM signals corresponding to bits of a digital signal greater than one can comprise multiple pulses separated in time. For a digital signal having only bit two on, a PWM signal will have a single pulse of a length two and a PDM signal 48 can have two (or more) pulses separated in time in the frame period corresponding to the digital signal, for example two one-bit pulses, each in a different half of the frame period, or four half-bit pulses evenly distributed throughout the frame period.

According to some embodiments of the present disclosure, because PDM pulses can be more evenly distributed in time, PDM signals 48 can comprise a number of pulses that is different from, for example greater than, a number of pulse-width-modulation pulses in an equivalent PWM signal, can have a maximum period that is less than the maximum period of PWM pulses in an equivalent PWM signal, the maximum period of any PDM pulse can be one half, one quarter, or one eighth of the maximum period of any PWM pulse, the maximum period of any PDM pulse can be twice the shortest period of any PWM pulse for an equivalent PWM signal, or any one or combination of these. A PDM signal 48 can comprise pulses that are individually separated in time. In some embodiments, PDM pulses are evenly distributed in time or have a common period, or both.

Figure 2:
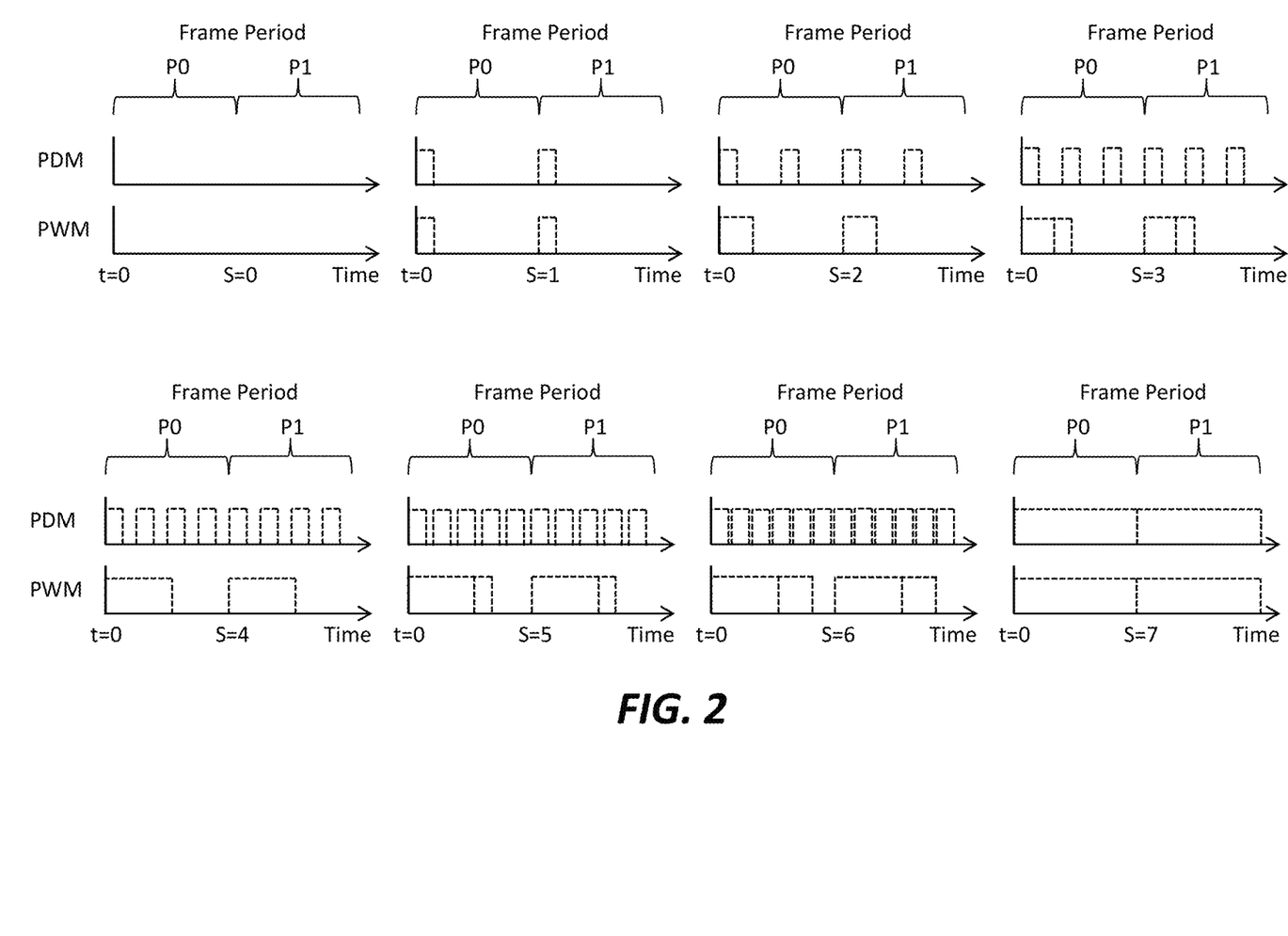
FIG. 2 is a timing diagram comparing pulse width modulation and pulse density modulation signals according to illustrative embodiments of the present disclosure.

FIG. 2 illustrates pulses during a frame period for display 10 for both a PWM signal and a PDM signal 48 for each of the eight values of a three-bit binary digital signal (e.g., values 0-7). However, according to embodiments of the present disclosure, pulse-density-modulation display 10 is not limited to a three-bit binary digital signal but can be driven with any binary digital input signal having a number of bits greater than one, e.g., two, three, four, eight, ten, twelve, fourteen, or sixteen bits for a number of brightness (luminance) levels equal to four, eight, sixteen, 256, 1024, 16384, or 65536, respectively. As shown in FIG. 2, for a display input signal 42 S equal to zero, one, or seven, PDM signal 48 and PWM signals can be identical, if the minimum period of PDM signal 48 equals the period of a PWM signal equal to one. (In some embodiments, PDM signal 48 can have a minimum period less than the period of a PWM signal equal to one, for example one half or one quarter, not illustrated in the Figures.)

For display input signal 42 S=2, a PWM signal can provide a single pulse for two bit periods and a PDM signal 48 can provide two pulses equally distributed and separated in time during a frame period P (e.g., frame periods P0, P1) each having a length equal to one bit period. For display input signal 42 S=3, a PWM signal can provide two pulses, one for a single bit period and one for two bit periods and a PDM signal 48 can provide three pulses during each of frame periods P0, P1 each having a length equal to one bit period. For display input signal 42 S=4, a PWM signal can provide a single pulse for four bit periods and a PDM signal 48 can provide four pulses during each of frame periods P0, P1 each having a length to equal to one bit period. For display input signal 42 S=5, a PWM signal can provide two pulses, one for a single bit period and one for four bit periods and a PDM signal 48 can provide five pulses during each of frame periods P0, P1 each having a length equal to one bit period. For display input signal 42 S=6, a PWM signal can provide two pulses, one for a two bit periods and one for four bit periods and a PDM signal 48 can provide six pulses during each of frame periods P0, P1 each having a length equal to one bit period. The PDM pulses can be, but are not necessarily, equally distributed as well as separated in time, as shown in FIG. 2.

Figure 3A:
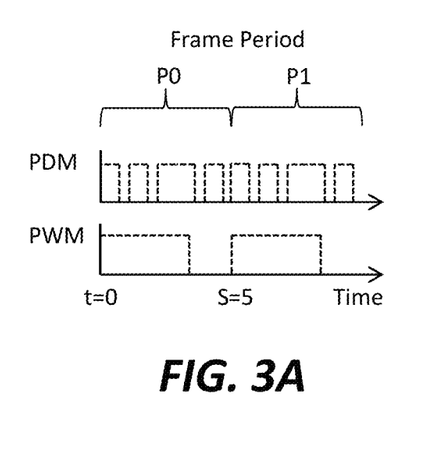
FIG. 3A is a timing diagram for pulse width modulation and pulse density modulation signals having different pulse density modulation signal periods according to illustrative embodiments of the present disclosure.
Figure 3B:
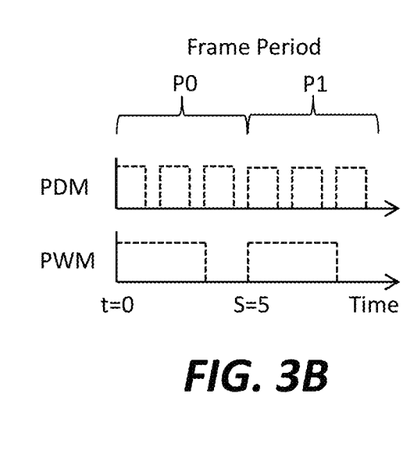
FIG. 3B is a timing diagram for pulse width modulation and pulse density modulation control signals having constant pulse density modulation signal periods according to illustrative embodiments of the present disclosure.

In some practical embodiments, there is a limit on switching frequencies for a light emitter 32, for example especially liquid crystal displays which can have liquid crystal switching times in the tens of milliseconds. Thus, according to some embodiments, for display input signals 42 having relatively large values (e.g., S=6 in FIG. 2), light emitters 32 cannot switch fast enough (or switching circuitry or conversion circuitry is not fast enough) to provide individual single-bit pulses. In some such embodiments and as shown in FIG. 3A for display input signal 42 S=5 and FIG. 3B for S=6, some PDM pulses are combined, so that PDM signal 48 has a mixture of one-bit pulses and two-bit pulses. PDM pulses for PDM signals 48 also could have period of one and a half bit periods, as shown in the FIG. 3B, or other fractional PWM single-bit periods. For PDM signals 48 having more than three bits, PDM pulses can be combined into larger pulses, for example three-bit pulses, four-bit pulses and so on. However, the maximum pulse period for a PDM signal 48 can still be less than the maximum pulse period for a PWM signal, as shown in FIGS. 3A and 3B. In some embodiments, inorganic light-emitting diode light emitters 32 are used in (e.g., as) pixels of a direct view pulse-density-modulation display 10 so there are no limitations imposed by, for example, liquid crystal switching times.

Figure 4:
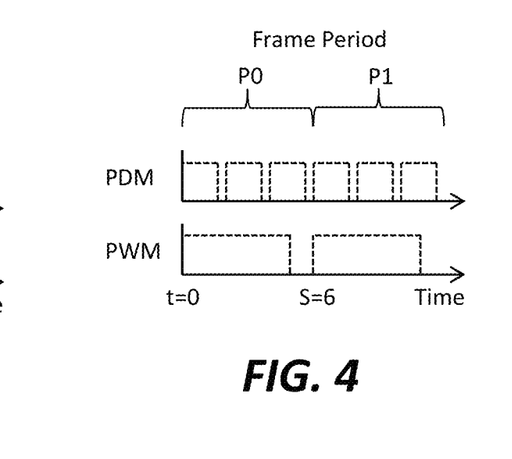
FIG. 4 is a timing diagram for pulse width modulation and pulse density modulation signals having larger constant pulse density modulation signal periods according to illustrative embodiments of the present disclosure.

FIG. 4 illustrates a PDM signal 48 for S=6 similar to that of FIG. 3AB, in which the PDM pulse periods are all the same, e.g., each pulse period is equal to 5/7 of frame periods P0, P1. Such an arrangement provides a more uniform distribution of pulses over time in a frame period and therefore less flicker.

Figure 5A:
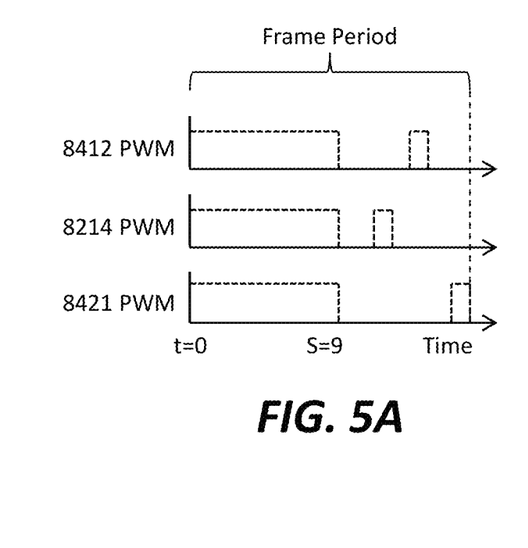
FIGS. 5A and 5B are timing diagrams for contiguous and non-contiguous pulse width modulation signals with bits disposed in different orders according to illustrative embodiments of the present disclosure.
Figure 5B:
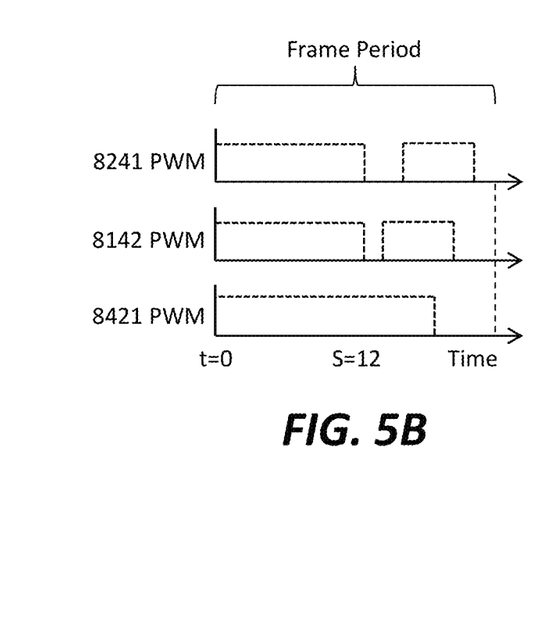

As shown in FIGS. 5A and 5B, for some PWM signal values, PWM signals can also have pulses that are separated in time, e.g., the PWM signals are not contiguous in time. FIGS. 5A and 5B illustrate PWM signals having four bits (16 values in a range of 0-15). As shown in FIG. 5A, when display input signal 42 S=9, a PWM signal will have a three-bit pulse (eight bit periods long=$2^3$) and a one-bit pulse, but these can be separated in a frame period as shown in the upper two graphs. Similarly, and as shown in FIG. 5B, when display input signal 42 S=12, a PWM signal will have a three-bit pulse (eight bit periods long=$2^3$) and a two-bit pulse (four bit periods long=$2^2$), but these can also be separated in a frame period, as shown in the upper graphs. Each graph is labeled with the sequence of the bit periods in the frame. Although this separation in a PWM signal can reduce the amount of flicker in a frame period, a PDM signal 48, as shown in FIGS. 2-4 will still have a less-variable output and less flicker over a frame period as more of the PDM signal 48 is distributed more evenly in time.

The frame period for a digital pulse-driven light emitter 32 and display 10 is typically selected to be sufficiently small that the human visual system cannot distinguish the separate pulses in a frame period. For example, films are projected at 24 frames per second and monitors typically operate at 30, 60, 70, or 72 frames per second. Higher rates of 120 frames per second or 240 frames per second are also known. However, when images presented on video displays 10 are captured by a temporal sampling device (e.g., an electronic digital camera 20) having a different frame rate or phase, the interaction between the different frame rates can cause the captured image to have perceptible flicker, for example scroll bars that move vertically across the display or periodic bright or dim images in an image sequence. This effect is exacerbated by the update process for a display 10, which is typically written one line (row) of display 10 at a time, so that when two sequential images with obviously different content (e.g., a cut from a first scene to a perceptibly different second scene), an image of the display can comprise a part of the first scene (e.g., on a bottom portion of display 10) and a part of the second scene (e.g., on a top portion of display 10).

Figure 6A:
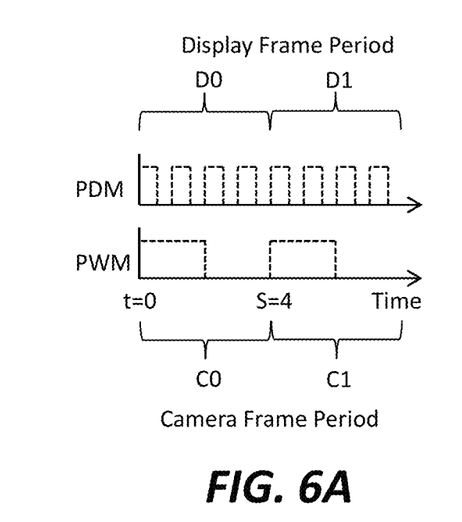
FIG. 6A is a timing diagram for pulse width modulation and pulse density modulation signals for display frame periods and camera frame periods that are the same according to illustrative embodiments of the present disclosure.
Figure 6B:
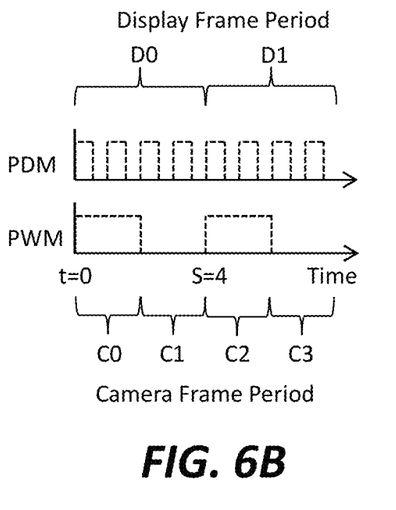
FIG. 6B is a timing diagram for pulse width modulation and pulse density modulation signals for display frame periods and camera frame periods that have different frequencies according to illustrative embodiments of the present disclosure.
Figure 6C:
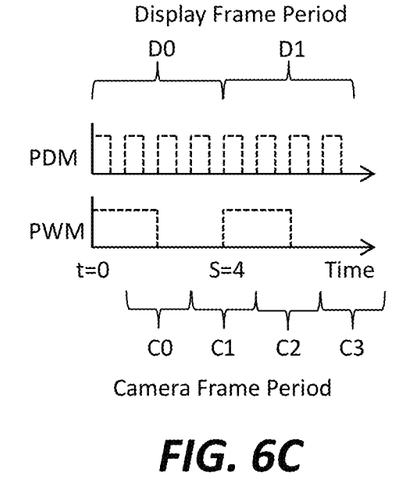
FIG. 6C is a timing diagram for pulse width modulation and pulse density modulation signals for display frame periods and camera frame periods that have different frequencies and a different phase according to illustrative embodiments of the present disclosure.

FIGS. 6A-6C provide a simple graphic illustration of the effect. As shown in FIG. 6A, the camera frame period and the display frame period are identical and in phase. Thus, PDM signal 48 and a PWM signal (for display input signal 42 S=4) will appear the same, if the bit period is sufficiently small and the switching speed between off and on is sufficiently fast. However, as shown in FIG. 6B for a camera frame period that is one half the display frame period and in phase, PWM signal (for display input signal 42 S=4) will alternate between a completely on signal and a completely off signal, causing flicker. In contrast, PDM signal 48 will drive LEDs 32 with two bit pulses during each camera frame so that no flicker is present. As shown in FIG. 6C for a camera frame period that is one half the display frame period and out of phase by 50%, PWM signal (for display input signal 42 S=4) will drive light emitters 32 with a signal that is on for two bit periods in each frame period P. PDM signal 48 will drive LEDs 32 with two bit pulses during each camera frame, which will provide an equivalent light output so that the phase difference corrects for the frequency difference.

Figure 7:
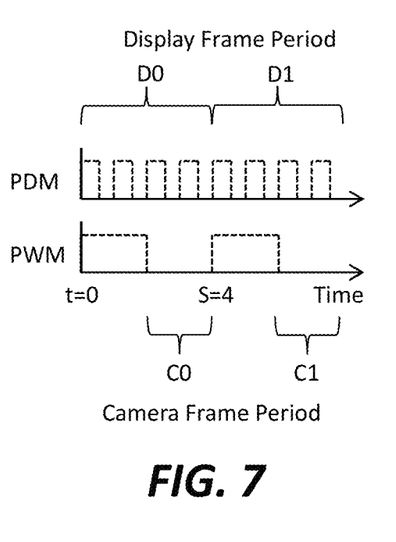
FIG. 7 is a timing diagram for pulse width modulation and pulse density modulation signals for display frame periods and camera frame periods that have different frequencies, different phases, and different interframe periods according to illustrative embodiments of the present disclosure.

In practice, as with displays 10, cameras 20 have a limit on the rate at which they can acquire frames. If, for example, camera 20 can only acquire frames at a rate equal to the frame capture period and the phase of camera 20 is 50% delayed from that of display 10, then camera 20 could capture no PWM signal at all, as shown in FIG. 7. In contrast, PDM signal 48 will provide light output for two bit periods for each frame, as desired.

Figure 8:
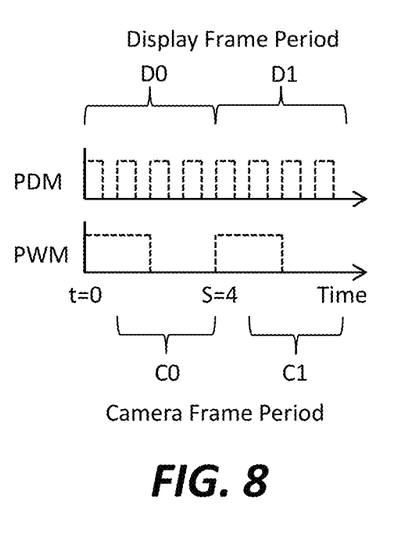
FIG. 8 is a timing diagram for pulse width modulation signals and pulse density modulation signals for display frame periods and camera frame periods that are different, have different interframe periods, and have different phases according to illustrative embodiments of the present disclosure.

According to some embodiments and as illustrated in FIG. 8, a display frame period (e.g., D0, D1) and a camera frame period (e.g., C0, C1) can be different and can have different phases (e.g., start at different times). FIG. 8 illustrates a display frame period equal to 8 one-bit pulses and a camera frame period equal to 6 one-bit pulses. The camera frame period has an interframe period equal to 2 pulses. For a signal S=4, camera 20 will record three PDM pulses from display 10 but only one pulse from an equivalent PWM signal (instead of the desired four). Thus, pulse-density-modulation display and image capture systems 90 of the present disclosure will provide a recorded video that is closer to the desired image sequence. Therefore, according to embodiments of the present disclosure, camera timing signal 26 specifies a camera frame period, display timing signal 46 specifies a display frame period, the camera frame period is shorter than the display frame period, and the number of PDM pulses emitted by display 10 is greater than the number of PDM pulses recorded by camera 20.

According to some embodiments, where it is known that the display and camera frame periods are different, that some PDM pulses emitted by display 10 are not recorded by camera 20, and the display frame period cannot be reduced to match the camera frame period (for example because of pixel switching limitations, data rate limitations, or conversion circuit 50 speed limitations), conversion circuit 50 or drive circuit 60 can be controlled to cancel the pulses that are not recorded by camera 20, reducing the power requirements of pulse-density-modulation display and image capture system 90.

Control circuit 40 can comprise a memory for storing display input signal 42. In some embodiments control circuit 40 comprises a memory for storing a non-contiguous pulse-density-modulation signal 48 converted by conversion circuit 50 from display input signal 42. The memory can be in each pixel 30 or, in some embodiments is located in display controller 12. In some embodiments, control circuit 40 receives a non-contiguous pulse-density signal, e.g., non-contiguous pulse-density modulation signal 48 from display controller 12 (which can comprise conversion circuit 50 rather than pixel 30) and uses received non-contiguous pulse-density modulation signal 48 to control light emitters 32 to emit light with a temporally variable constant-current control signal.

Figure 9:
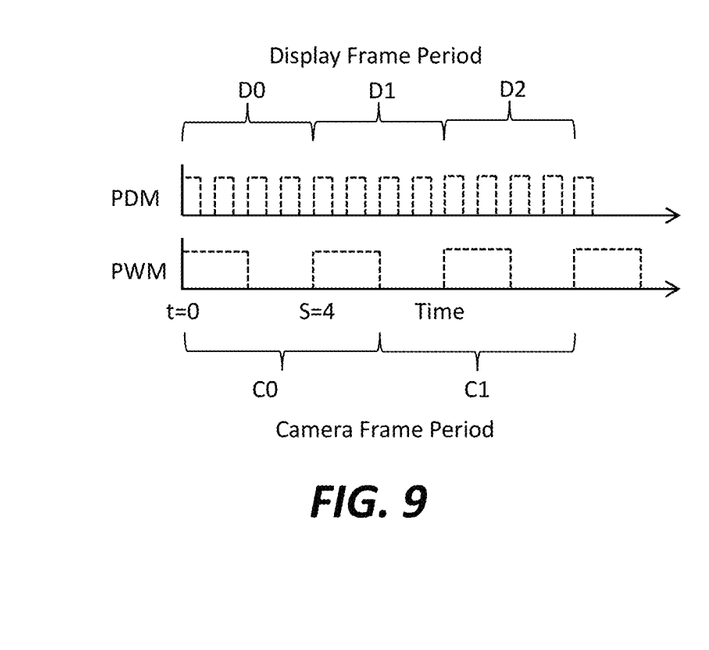
FIG. 9 is a timing diagram for pulse density modulation signals for display frame periods and camera frame periods that are longer than the display frame periods according to illustrative embodiments of the present disclosure.

In some embodiments of the present disclosure, camera timing signal 26 specifies a camera frame period, display timing signal 46 specifies a display frame period and the camera frame period is longer than the display frame period. In such embodiments, PDM signal 48 can still provide an advantage, as shown in FIG. 9. In this illustration, each camera frame period (e.g., C0, C1) is 1.5 times the length of each display frame period (e.g., D1, D1, D2). The recorded camera signal will be consistently correct for PDM signal 48, recording 6 pulses per camera frame period for a display signal S=4 pulses per display frame period at a slower camera frame rate, but the PWM signal will alternate between four pulses and two pulses per recorded camera frame period, inducing flicker.

Figure 10:
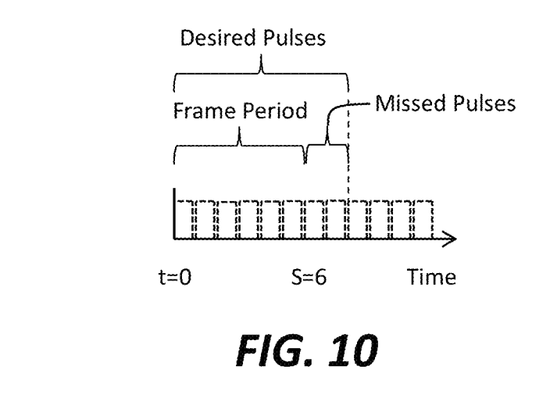
FIG. 10 is a timing diagram for pulse density modulation signals for display frame periods that are too short to display all of the pulses in an image according to illustrative embodiments of the present disclosure.

More generally, embodiments of the present disclosure provide a system and method for a completely decoupled (unsynchronized) camera 20 and display 10 with reduced flicker and improved image quality. Displays 10 with extremely high frame rates (e.g., greater than 60 or 72 frames per second, or no less than 100, 120, 200, or 240 frames per second) that are faster (shorter) than the ability of display 10 to transfer or process input image data (e.g., the display hardware is limited by data transfer or data processing rates) can still operate with reduced imaging defects. For example, referring to FIG. 10, a pulse-density-modulation display 10 can operate at a six pulses per frame period rate but an eight-bit input signal with 8 pulses per period is received. If the pulses are distributed evenly to the best extent possible, at least three quarters (six/eight) of the pulses will be displayed (output) in each frame so that an 8-bit image is displayed as a 6-bit image. Mathematically, the number of pulses output each period will be the pulse rate divided by the desired bit rate for a pulse-density-modulation display 10. In some such embodiments, pulse-density-modulation display 10 runs out of time to output the pulses in a display frame period before new data arrives in a next frame period. Display 10 is receiving image data faster than it can display the image data. In consequence, for some display input signals 42, only some and less than all of the pulses are output in each frame period. As the frame rate increases and the frame period decreases, the number of pulses output in each frame period decreases and the image quality of the displayed image in each frame period will degrade gracefully and smoothly, for example by one bit or pulse at a time as the frame rate increases and the frame period decreases. In contrast, the image degradation in a PWM system will depend on the image data in the image, leading to an inconsistent flicker. Thus, according to some embodiments of the present disclosure for a pulse-density-modulation display 10, display timing signal 46 specifies a display frame rate, display input signal 42 or a conversion circuit 50 (e.g., control circuit 40) data processing rate limit a display output rate for controlling non-contiguous pulse-density-modulation signal 48, and the display frame rate is greater than the display output rate (e.g., the display output rate is less than the display frame rate and the display output period is larger than the display frame period).

According to embodiments of the present disclosure in which control circuit 40 converts display input signal 42 to a non-contiguous pulse-density-modulation signal 48 with conversion circuit 50 and drives light-emitter 32 with non-contiguous pulse-density-modulation signal 48, a pulse-density-modulation display 10 comprises a plurality of pixels 30. Each pixel 30 comprises a light emitter 32 that controllably emits light at a constant current for a variable amount of time and a control circuit 40 connected to light emitter 32 to control light emitter 32 to emit light. Control circuit 40 is responsive to a display input signal 42 specifying the desired luminance of light emitter 32. Control circuit 40 converts display input signal 42 to a non-contiguous pulse-density-modulation signal 48 (e.g., with conversion circuit 50) and controls light emitter 32 to emit light in response to non-contiguous pulse-density-modulation signal 48 with a temporally variable constant-current control signal. Each pixel 30 emits light responsive to display timing signal 46.

Figure 11A:
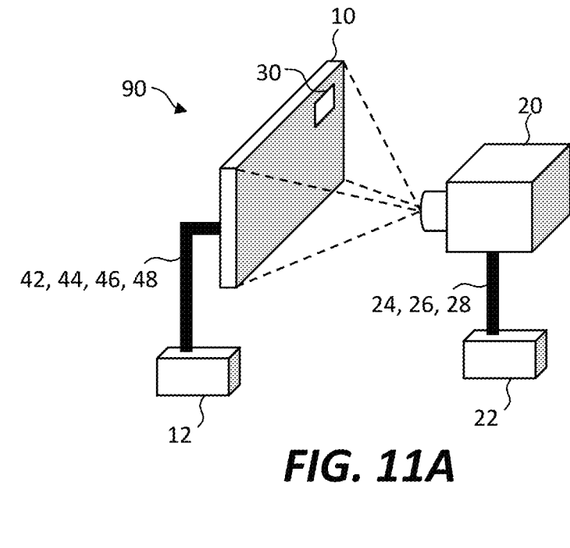
FIG. 11A is a perspective of a display and image capture system and FIG. 11B is a schematic diagram of a pixel in the display that receives a non-contiguous pulse density modulation signal according to illustrative embodiments of the present disclosure.
Figure 11B:
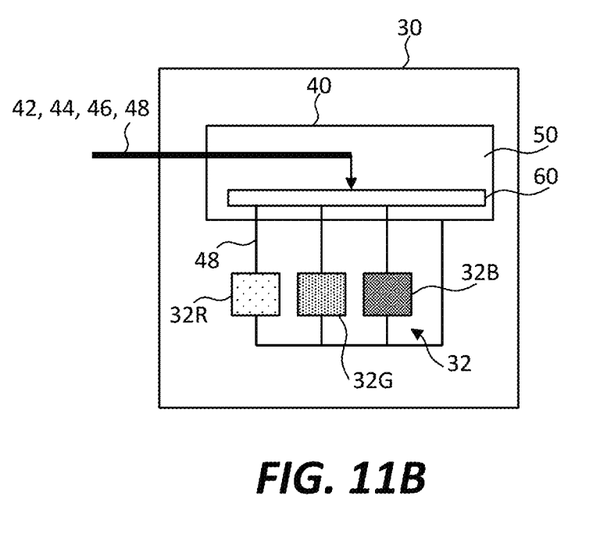

According to embodiments of the present disclosure in which a non-contiguous pulse-density-modulation signal 48 is provided to pixel 30 to drive light-emitter 32 with non-contiguous pulse-density-modulation signal 48, for example as shown in FIG. 11A, a pulse-density-modulation display 10 comprises a plurality of pixels 30. Each pixel 30 comprises a light emitter 32 that controllably emits light at a constant current for a variable amount of time and a control circuit 40 connected to light emitter 32 to control light emitter 32 to emit light. Control circuit 40 is responsive to display input signal 42 specifying the desired luminance of light emitter 32. Display input signal 42 is a non-contiguous pulse-density-modulation signal 48 and controls light emitter 32 to emit light in response to non-contiguous pulse-density-modulation signal 48 with a temporally variable constant-current control signal, for example as shown in FIG. 11B.

For simplicity, the examples of FIGS. 3A-8 illustrate cameras 20 with capture frame rates that are an integer fraction of the frame rate, for example exactly one half of the frame rate, of display 10. In practice, camera frame rates will likely vary with respect to display frame rates, for example by only a few percent, and so the flicker or scrolling effects will similarly vary in severity and frequency. To use an audio analogy, in effect images captured by camera 20 and shown on display 10 operating at different frame rates visually beat against each other to provide optical effects somewhat analogous to audio effects from two sound sources that are slightly out of tune. In any of these embodiments, a PDM signal 48 can reduce the perceptible flicker effects found in video images of displays 10 captured by a video camera 20.

Figure 12:
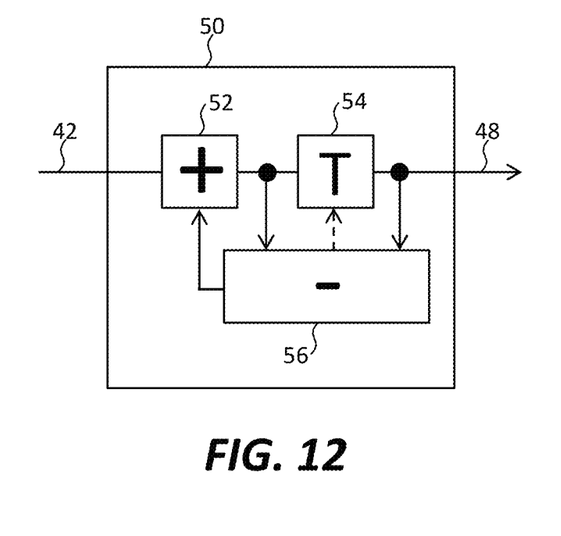
FIG. 12 is a simplified schematic block diagram of a pulse density modulation conversion circuit according to illustrative embodiments of the present disclosure.

FIG. 12 illustrates a simple embodiment of a conversion circuit 50 with display input signal 42, output PDM signal 48, and an adder 52 that adds a difference signal from a subtractor 56 (initialized to zero) derived from a difference from the summed signal and a threshold signal from a thresholder 54 (that provides the digital output PDM signal 48). A difference between digitized PDM signal 48 and the display input signal 42 is an error that is accumulated by adder 52 and then thresholded again by thresholder 54. Over time, conversion circuit 50 will produce pulses corresponding to a PDM signal 48. Pulse density circuits are known in the art and can be applied in the present disclosure without limitation.

Control circuits 40, conversion circuits 50, and drive circuits 60 can be constructed using analog or digital circuits, for example employing digital, analog, or mixed-signal integrated circuits disposed on a display substrate or on pixel modules disposed on a display substrate. Such integrated circuits can be provided in bare, unpackaged die and micro-transfer printed from source wafers to a desired target substrate (e.g., a display substrate or pixel module substrate) and therefore comprise broken (e.g., fractured) or separated tethers. Similarly, light emitters 32 such as inorganic light emitting diodes can be transferred from LED source wafers to a desired target substrate (e.g., a display substrate or pixel module substrate) and can also comprise broken (e.g., fractured) or separated tethers. Bare-die integrated circuits disposed on a display 10 or pixel module substrate can be electrically connected using photolithographic or printed-circuit board methods and materials.

According to embodiments of the present disclosure, a pulse-density-modulation control integrated circuit comprises control circuit 40 responsive to an input signal (e.g., display input signal 42) specifying the desired luminance of a light emitter 32. Control circuit 40 can be an electronic circuit that is operable to convert the display input signal 42 to a non-contiguous pulse-density-modulation signal 48 (e.g., using a conversion circuit 50). The PDM control integrated circuit (or control circuit 40) can also comprise a drive circuit 60 responsive to the pulse-density-modulation signal 48 to produce a temporally variable constant-current control signal. The control signal can also have a constant voltage (when on).

Similarly, a pulse-density-modulation pixel 30 control circuit 40 can comprise a light emitter 32 that controllably emits light at a constant current for a variable amount of time and an input circuit responsive to a display input signal 42 specifying the desired luminance of the light emitter (e.g., a display input signal 42). A control circuit 40 is connected to light emitter 32 to control light emitter 32 to emit light.

Control circuit 40 is responsive to display input signal 42 and converts display input signal 42 to a non-contiguous pulse-density-modulation signal 48 (e.g., with a conversion circuit 50) and controls light emitter 32 (e.g., with a drive circuit 60) to emit light in response to non-contiguous pulse-density-modulation signal 48 with a temporally variable constant-current control signal.

In some embodiments, pixel 30 comprises multiple light emitters 32 so that display input signal 42 is a first display input signal 42, light emitter 32 is a first light emitter 32 and pulse-density-modulation pixel 30 control circuit 40 comprises a second light emitter 32 that controllably emits light at a constant current for a variable amount of time and an input circuit 32 responsive to an input signal (e.g., a second display input signal 42) specifying the desired luminance of second light emitter 32. Control circuit 40 is connected to second light emitter 32 to control second light emitter 32 to emit light and is responsive to second display input signal 42. Control circuit 40 converts second display input signal 42 to a second non-contiguous pulse-density-modulation signal 48 (e.g., with conversion circuit 50) and controls second light emitter 32 to emit light in response to second non-contiguous pulse-density-modulation signal 48 with a temporally variable constant-current control signal. First light emitter 32 can emit red light and second light emitter can emit green light. In some embodiments, pixel 30 comprises a third light emitter 32 that emits blue light and is driven by control circuit 40 in the same way that first and second light emitters 32 are (e.g., as shown in FIG. 1B).

Some embodiments of the present disclosure provide a display 10 comprising an array of pixels 30. Such a pulse-density-modulation display 10 can comprise a plurality of pixels 30. Each pixel 30 comprises a light emitter 32 that controllably emits light at a constant current for a variable amount of time and a control circuit 40 connected to light emitter 32 to control light emitter 32 to emit light. Control circuit 40 is responsive to an input signal (e.g., a display input signal 42) specifying the desired luminance of light emitter 32. Control circuit 40 converts display input signal 42 (e.g., with a conversion circuit 50) to a non-contiguous pulse-density-modulation signal 48 and controls light emitter 32 to emit light in response to non-contiguous pulse-density-modulation signal 48 with a temporally variable constant-current control signal.

In some embodiments, control circuit 40 controls pixel 30 (e.g., light emitter(s) 32) with a frame rate that is less than 24 frames per second, e.g., no greater than 10 frames per second. Such a slow frame rate can have perceptible flicker when driven with a PWM signal but can have reduced flicker when driven with non-contiguous pulse-density-modulation signal 48.

Inorganic light-emitting diodes (iLEDs) can operate most efficiently at a given current. Moreover, different types of iLEDs or iLEDs that emit different colors of light can operate most efficiently at different constant currents or different voltages and can be driven at different constant currents for variable time periods. When light emitter 32 is off, no current flows to light emitter 32. When light emitter 32 is on, ideally a constant, unvarying current at a fixed voltage flows to the operational light emitter 32. According to some embodiments of the present disclosure, a PDM circuit can control each (e.g., respective) light emitter 32 in each pixel 30 in an active-matrix display 10 comprising an array of pixels 30, for example with a different desired constant current and voltage. When operational, light emitter 32 emits light at a constant luminance. If light emitter 32 is turned on and off quickly, the human visual system cannot perceive the switching and instead perceives a variable brightness depending on the amount of time the light emitter is on at the predetermined constant luminance.

Drive circuit 60 comprises an effectively binary digital switch fed by a constant-current supply because it does not continuously modulate the amount of current supplied by the constant-current supply but rather operates in a first mode in which light emitter 32 is turned off (e.g., at a zero voltage) and no current flows through light emitter 32 and a second mode in which the current flows through light emitter 32 at a constant current and non-zero voltage specified by the constant-current supply. Drive circuit 60 does not function as an analog switch or amplifier and does not continuously modulate the current passing through light emitter(s), for example does not provide an amount of current greater than zero and less than the current supplied by the constant-current supply, within circuit design and manufacturing capabilities.

Certain embodiments of the present disclosure can be applied to active-matrix inorganic light-emitting diode displays 10. For example, display control signals can comprise a row-control signal provided on a row wire and a column-data signal provided on a column wire and electrically connected to an array of pixels 30 arranged in rows and columns on a display substrate in an active-matrix display 10. Each pixel 30 can comprise one or multiple light emitters 32, each of which can comprise a light emitter 32, for example a micro-inorganic-light-emitting diode, and control circuits 40. Each of multiple light emitters 32 can be or include a different inorganic light-emitting diode that emits a different color of light when provided with electrical current at a suitable voltage.

According to some embodiments of the present disclosure, control circuit 40 can comprise any of a variety of transistors, for example transistors such as those known in the electronics, integrated circuit, and display industries. Transistors can be thin-film transistors (TFTs), for example amorphous transistors or polysilicon transistors and can be a semiconductor thin-film circuit formed on a substrate, such as a display substrate. In some embodiments, transistors are crystalline silicon or compound semiconductor transistors, for example made in an integrated circuit process and can be transfer printed onto a display substrate or onto a pixel module substrate that is transfer printed onto the display substrate. Such transfer-printed structure can comprise fractured or separated tethers.

According to some embodiments of the present disclosure, light emitters 32 are micro-inorganic-light-emitting diodes (micro-iLEDs) with at least one of a width and a length that is no greater than 500 microns (e.g., no greater than 200 microns, no greater than 100 microns, no greater than 50 microns, no greater than 25 microns, no greater than 15 microns, no greater than 12 microns, no greater than 8 microns, or no greater than 5 microns). Micro-LEDs provide an advantage according to some embodiments of the present disclosure since they are sufficiently small and can be disposed spatially close together so that the different micro-LEDs in a pixel 30 cannot be readily distinguished by the human visual system in a display at a desired viewing distance, improving color mixing of light emitted by pixel 30 and providing apparent improvements in display resolution. Embodiments of the present disclosure can be constructed using micro-transfer printing.

Methods of forming useful micro-transfer printable structures are described, for example, in the paper *AMOLED Displays using Transfer-Printed Integrated Circuits, Journal of the SID,* 19(4), 2012, and U.S. Pat. No. 8,889,485. For a discussion of micro-transfer printing techniques see, U.S. Pat. Nos. 8,722,458, 7,622,367 and 8,506,867, the disclosures of which are hereby incorporated by reference in their entirety. Micro-transfer printing using compound micro-assembly structures and methods can also be used with the present disclosure, for example, as described in U.S. patent application Ser. No. 14/822,868, filed Aug. 10, 2015, entitled *Compound Micro-Assembly Strategies and Devices*, the disclosure of which is hereby incorporated by reference in its entirety. In some embodiments, pixels 30 are compound micro-assembled devices.

As is understood by those skilled in the art, the terms "over" and "under", "above" and "below", and "top" and "bottom" are relative terms and can be interchanged in reference to different orientations of the layers, elements, and substrates included in the present invention. For example, a first layer on a second layer, in some implementations means a first layer directly on and in contact with a second layer. In other implementations a first layer on a second layer includes a first layer and a second layer with another layer therebetween.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously.

Having expressly described certain embodiments, it will now become apparent to one skilled in the art that other embodiments incorporating the concepts of the disclosure may be used. Therefore, the claimed invention should not be limited to the described embodiments, but rather should be limited only by the spirit and scope of the following claims.

Parts List

10 display/pulse-density-modulation display
12 display controller
20 camera
22 camera controller
24 camera control bus
26 camera timing signal
28 camera output signal
30 pixel
32 light emitter
32R red-light emitter
32G green-light emitter
32B blue-light emitter
40 control circuit
42 display input signal
44 display control bus
46 display timing signal
48 non-contiguous pulse-density-modulation signal
50 conversion circuit
52 adder
54 thresholder
56 subtractor
60 drive circuit
90 pulse-density-modulation display and image capture system

The invention claimed is:

1. A pulse-density-modulation display, comprising:
   a display comprising a plurality of pixels, each of the pixels comprising
   (i) a light emitter that is controllable to emit light at a constant current for a variable amount of time, and
   (ii) a control circuit connected to the light emitter to control the light emitter to emit the light, the control circuit responsive to a display input signal specifying desired luminance of the light emitter, wherein the control circuit is operable to convert the display input signal to a non-contiguous pulse-density-modulation signal,
   wherein the light emitter emits the light in response to the non-contiguous pulse-density-modulation signal and a display timing signal,.
   wherein the non-contiguous pulse-density-modulation signal comprises a number of pulse-density-modulation (PDM) pulses and (i) the number of PDM pulses is greater than a number of pulse-width-modulation (PWM) pulses for an equivalent signal, (ii) the number of PDM pulses is different from a number of bits in the display input signal, (iii) a maximum period of any of the PDM pulses is less than a maximum period of any PWM pulses for an equivalent signal, (iv) a maximum period of any PDM pulse is one half or less of a maximum period of any PWM pulse for an equivalent signal, (v) a maximum period of any PDM pulse is no more than twice the shortest period of any PWM pulse for an equivalent PWM signal, or (vi) any combination of (i), (ii), (iii), (iv) and (v).

2. The pulse-density-modulation display of claim 1, further comprising a sampling camera that records the pixels responsive to a camera timing signal different from the display timing signal.

3. The pulse-density-modulation display of claim 1, wherein the light emitter is an inorganic light emitter.

4. The pulse-density-modulation display of claim 1, wherein the display input signal is an analog signal.

5. The pulse-density-modulation display of claim 1, wherein the display input signal is a digital signal.

6. The pulse-density-modulation display of claim 1, wherein the non-contiguous pulse-density-modulation signal comprises pulses and (i) the pulses are evenly distributed in time, or (ii) the pulses have a common period, or (iii) both (i) and (ii).

7. The pulse-density-modulation display of claim 1, wherein the non-contiguous pulse-density-modulation signal comprises pulses that are individually separated in time.

8. The pulse-density-modulation display of claim 1, wherein the non-contiguous pulse-density-modulation signal is a delta sigma signal.

9. The pulse-density-modulation display of claim 1, wherein the control circuit is operable to receive the display timing signal and the display input signal that are temporally combined on a common bus or wire.

10. The pulse-density-modulation display of claim 1, wherein the display timing signal has a different period, phase, or period and phase than a period, phase, or period and phase of a camera timing signal, respectively, of a consumer or commercial camera recording the display.

11. The pulse-density-modulation display of claim 1, wherein (i) the number of PDM pulses is greater than a number of pulse-width-modulation (PWM) pulses for an equivalent signal.

12. The pulse-density-modulation display of claim 1, wherein (ii) the number of PDM pulses is different from a number of bits in the display input signal.

13. The pulse-density-modulation display of claim 1, wherein (iii) a maximum period of any of the PDM pulses is less than a maximum period of any PWM pulses for an equivalent signal.

14. The pulse-density-modulation display of claim 1, wherein (iv) a maximum period of any PDM pulse is one half or less of a maximum period of any PWM pulse for an equivalent signal.

15. The pulse-density-modulation display of claim 1, wherein (v) a maximum period of any PDM pulse is no more than twice the shortest period of any PWM pulse for an equivalent PWM signal.

16. A pulse-density-modulation display, comprising:
   a display comprising a plurality of pixels, each of the pixels comprising
      (i) a light emitter that is controllable to emit light at a constant current for a variable amount of time, and
      (ii) a control circuit connected to the light emitter to control the light emitter to emit the light, the control circuit responsive to a display input signal specifying desired luminance of the light emitter, wherein the control circuit is operable to convert the display input signal to a non-contiguous pulse-density-modulation signal; and
   a sampling camera that records the pixels responsive to a camera timing signal different from the display timing signal,
   wherein the light emitter emits the light in response to the non-contiguous pulse-density-modulation signal and a display timing signal.

17. The pulse-density-modulation display of claim 16, wherein the display timing signal has a different period from the camera timing signal.

18. The pulse-density-modulation display of claim 16, wherein the display timing signal is out of phase with the camera timing signal.

19. The pulse-density-modulation display of claim 16, wherein the non-contiguous pulse-density-modulation signal comprises a number of pulse-density-modulation (PDM) pulses and the number of PDM pulses emitted by the display is greater than the number of PDM pulses recorded by the sampling camera.

20. The pulse-density-modulation display of claim 16, wherein the camera timing signal specifies a camera frame period, the display timing signal specifies a display frame period and the camera frame period is shorter than the display frame period.

21. The pulse-density-modulation display of claim 16, wherein the control circuit controls the light emitter to not emit light during an interframe period when the camera is not recording.

22. The pulse-density-modulation display of claim 16, wherein the camera timing signal specifies a camera frame period, the display timing signal specifies a display frame period and the camera frame period is longer than the display frame period.

23. A pulse-density-modulation display, comprising:
   a display comprising a plurality of pixels, each of the pixels comprising
      (i) a light emitter that is controllable to emit light at a constant current for a variable amount of time, and
      (ii) a control circuit connected to the light emitter to control the light emitter to emit the light, the control circuit responsive to a display input signal specifying desired luminance of the light emitter, wherein the control circuit is operable to convert the display input signal to a non-contiguous pulse-density-modulation signal,
   wherein the light emitter emits the light in response to the non-contiguous pulse-density-modulation signal and a display timing signal,
   wherein the display timing signal has a different period, phase, or period and phase than a period, phase, or period and phase of a camera timing signal, respectively, of a consumer or commercial camera recording the display.

* * * * *